United States Patent
Smith et al.

(12) United States Patent (10) Patent No.: US 12,428,079 B2
(45) Date of Patent: Sep. 30, 2025

(54) DEBRIS DEFLECTOR FOR A FINAL DRIVE

(71) Applicant: Caterpillar Inc., Peoria, IL (US)

(72) Inventors: Edward Richard Smith, Peoria, IL (US); Daniel Darrell Bell, Peoria, IL (US); Bradley James Miller, Geneva, IL (US)

(73) Assignee: Caterpillar Inc., Peoria, IL (US)

( * ) Notice: Subject to any disclaimer, the term of this patent is extended or adjusted under 35 U.S.C. 154(b) by 857 days.

(21) Appl. No.: 17/591,689

(22) Filed: Feb. 3, 2022

(65) Prior Publication Data

US 2023/0242194 A1    Aug. 3, 2023

(51) Int. Cl.
*B62D 55/088*    (2006.01)

(52) U.S. Cl.
CPC ........ *B62D 55/088* (2013.01); *B62D 55/0887* (2013.01)

(58) Field of Classification Search
CPC .............. B62D 55/088; B62D 55/0882; B62D 55/0887
See application file for complete search history.

(56) References Cited

U.S. PATENT DOCUMENTS

| | | |
|---|---|---|
| 6,293,631 B1 | 9/2001 | Freeman |
| 7,946,661 B1 | 5/2011 | Freemen |
| 8,297,877 B2 | 10/2012 | Erdmann et al. |
| 8,356,680 B2 | 1/2013 | Jackson |
| 8,770,669 B2 | 7/2014 | Wachsmann et al. |
| 9,297,125 B2 | 3/2016 | Hammes et al. |
| 9,446,804 B2 | 9/2016 | Haven et al. |
| 11,208,163 B2* | 12/2021 | Freeman ............ B62D 55/0887 |
| 2002/0140287 A1 | 10/2002 | Fee et al. |
| 2019/0276100 A1* | 9/2019 | Tokach ................ B62D 55/088 |

FOREIGN PATENT DOCUMENTS

| | | |
|---|---|---|
| JP | 2008201356 A | 9/2008 |
| JP | 2017052312 A | 3/2017 |

OTHER PUBLICATIONS

Germany Patent Office Action for Germany Patent Appln. No. 10 2023 101 851.5, mailed Jul. 13, 2023 (10 pgs).

* cited by examiner

*Primary Examiner* — Jason R Bellinger
(74) *Attorney, Agent, or Firm* — von Briesen & Roper, s.c.

(57) ABSTRACT

A debris deflector includes an at least partially annular body defining a central axis, a radial direction, and a circumferential direction about the central axis. The at least partially annular body includes an outer radial extremity defining surface, an inner radial extremity defining surface, a first circumferential extremity defining surface, and a second circumferential extremity defining surface. A first deflection surface extends from the first circumferential extremity defining surface, and defines a first surface normal that points away from the central axis.

18 Claims, 12 Drawing Sheets

DEBRIS DEFLECTOR FOR A FINAL DRIVE

TECHNICAL FIELD

The present disclosure relates generally to machines having final drives for propelling the machine across terrain, and, more specifically, to a debris deflector used to prevent the fouling of the mechanism(s) of the final drive caused by the infiltration of the final drive by debris or other contaminants.

BACKGROUND

Tracked machines are used to in the construction, agriculture, earthmoving, and mining industries, etc. to move dirt, rocks, and other ground debris. In general, tracked machines include a final drive that provides torque to a drive sprocket that in turn propels a track chain assembly with shoes for propelling the machine across the terrain.

Debris such as rocks, dirt, wire, mud, etc. have the tendency to infiltrate the final drive, which could cause damage to the components and mechanism(s) of the final drive, necessitating unwanted maintenance and associated downtime, and a loss of revenue for an economic endeavor employing the tracked machine.

U.S. Pat. No. 8,356,680 (the '680 patent) discloses a final drive assembly that is used to support a track chain on a track type machine. The final drive assembly includes a sprocket hub mounted for rotation on a fixed hub. A seal is positioned between the fixed hub and the sprocket hub. The fixed hub and the sprocket hub define a seal protection passageway that extends between an outer surface and the seal. The seal protection passageway includes a labyrinth located between an annular attachment flange and the seal along a rotation axis of the sprocket hub. The outer surface includes a valley between a sprocket mount of the sprocket hub and a machine mount of the fixed hub. The seal protection passageway opens at a greater radius than a minimum radius of the valley.

As can be seen, the '680 patent helps prevent the amount of infiltration of debris at the final drive/transmission interface. However, there still exists a need to deflect debris so that such the initiation of infiltration is prevented. Also, other locations of debris infiltration may also need to be protected.

SUMMARY

A final drive for use with a machine according to an embodiment of the present disclosure may comprise a fixed interior hub, a rotating exterior hub, a sprocket attached to the rotating exterior hub, a shaft housing extending between the fixed interior hub toward the rotating exterior hub, a gear housing extending between the shaft housing and the rotating exterior hub, and a debris deflector assembly attached to the fixed interior hub. The debris deflector assembly may include a pair of bolt-on mounting rings, and a pair of debris deflectors attached to the pair of bolt-on mounting rings.

A debris deflector subassembly for preventing the fouling of a final drive according to an embodiment of the present disclosure may comprise a bolt-on mounting ring including an at least partially ringlike body defining an axis of rotation, a radial direction, and a circumferential direction about the axis of rotation. The at least partially ringlike body may include an outer circumferential extending surface, an inner circumferential extending surface, a first circumferential end defining surface, a second circumferential end defining surface, a front surface, and a rear surface. The at least partially ringlike body may also define a first fastener receiving counterbore on the front surface that is disposed circumferentially adjacent the first circumferential end defining surface, and a first fastener straight thru-hole that is spaced circumferentially from first fastener receiving counterbore a predetermined angle about the axis of rotation ranging from 50.0 degrees to 70.0 degrees.

A debris deflector for preventing the fouling of a final drive according to an embodiment of the present disclosure may comprise an at least partially annular body defining a central axis, a radial direction, and a circumferential direction about the central axis. The at least partially annular body may include an outer radial extremity defining surface, an inner radial extremity defining surface, a first circumferential extremity defining surface, and a second circumferential extremity defining surface. The at least partially annular body may include a first deflection surface extending from the first circumferential extremity defining surface, and may define a first surface normal that points away from the central axis.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a bolt-on debris deflector will be discussed herein that may deflect or push any potentially damaging material away from the sensitive areas of the final drive system, ultimately protecting the final drive from debris that could enter into the internal components and result in hardware damage or failure. Also, mounting ring(s) employed to attach the debris deflector to the final drive or machine will be described.

Figure 1:
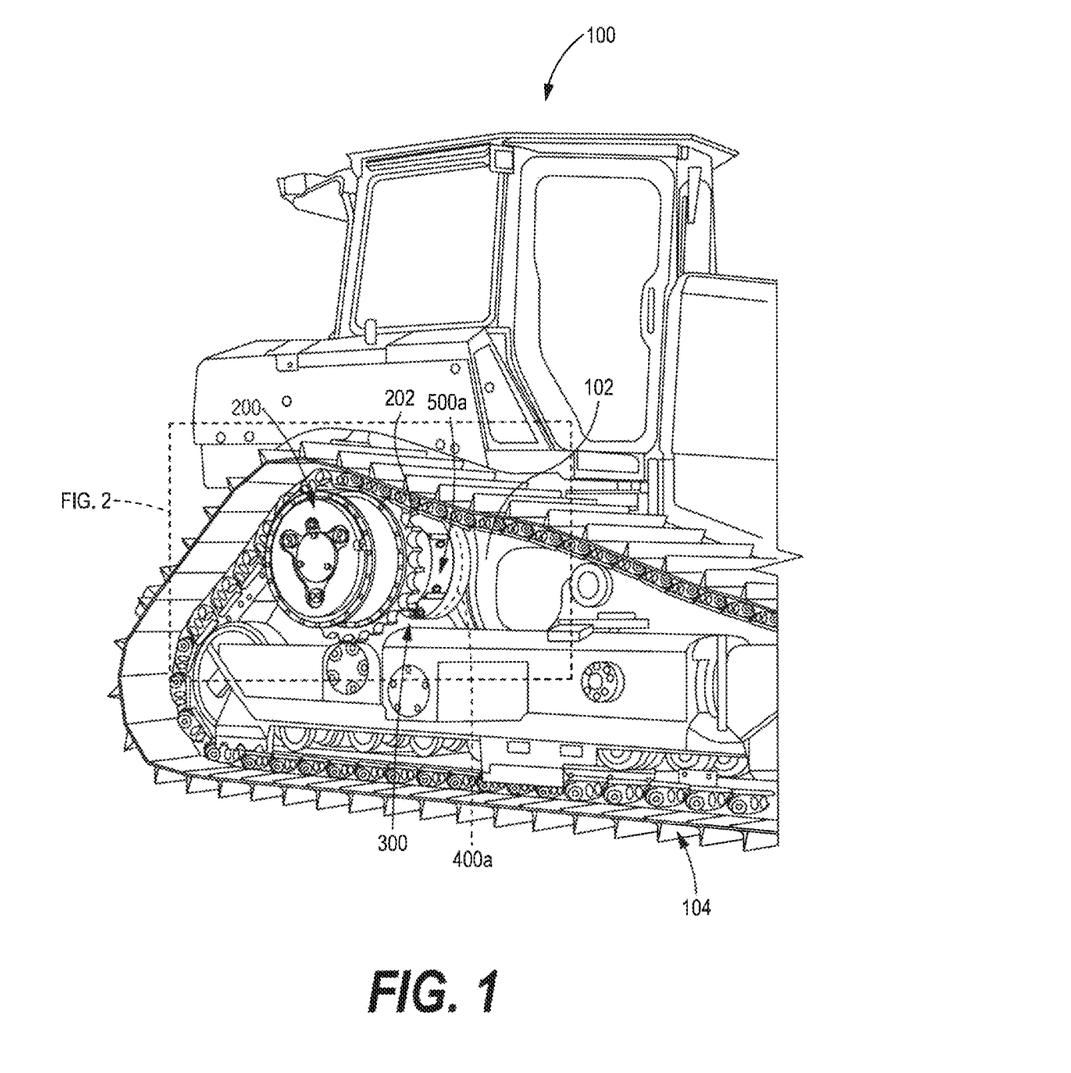
FIG. 1 is a side oriented perspective view of a tracked machine such as a bulldozer or the like, revealing its internal final drive having a debris deflector employed to protect the final drive according to an embodiment of the present disclosure.

Starting with FIG. 1, a machine 100 which may be track type tractor or a bulldozer, etc. that includes a machine body 102 that may use a bolt-on debris deflector 500, a debris deflector assembly 300, a debris deflector subassembly 400, and a final drive 200 configured according to various embodiments of the present disclosure will now be described. It is to be understood that other type of machines including those with wheels may employ various embodiments of the present disclosure, and are included within the scope of the present disclosure. Also, the final drive that is shown is associated with an elevated drive sprocket, but this may not be the case for other embodiments of the present disclosure (e.g., an inline final drive may be employed, etc.).

The machine may also include a track chain 104 that is driven by the sprocket 202 of the final drive 200 to propel the machine 100 over terrain in a manner known in the art.

More specifically, the final drive 200 (typically an assembly) may be similarly or identically configured as that shown and described in the '680 patent except for the following differences with respect to the debris deflector(s) and mounting ring(s) that will be described herein. It is also contemplated that other machines and drive systems may use various embodiments of the debris deflector, etc. as will be discussed herein including those using wheels or the like, etc.

Figure 2:
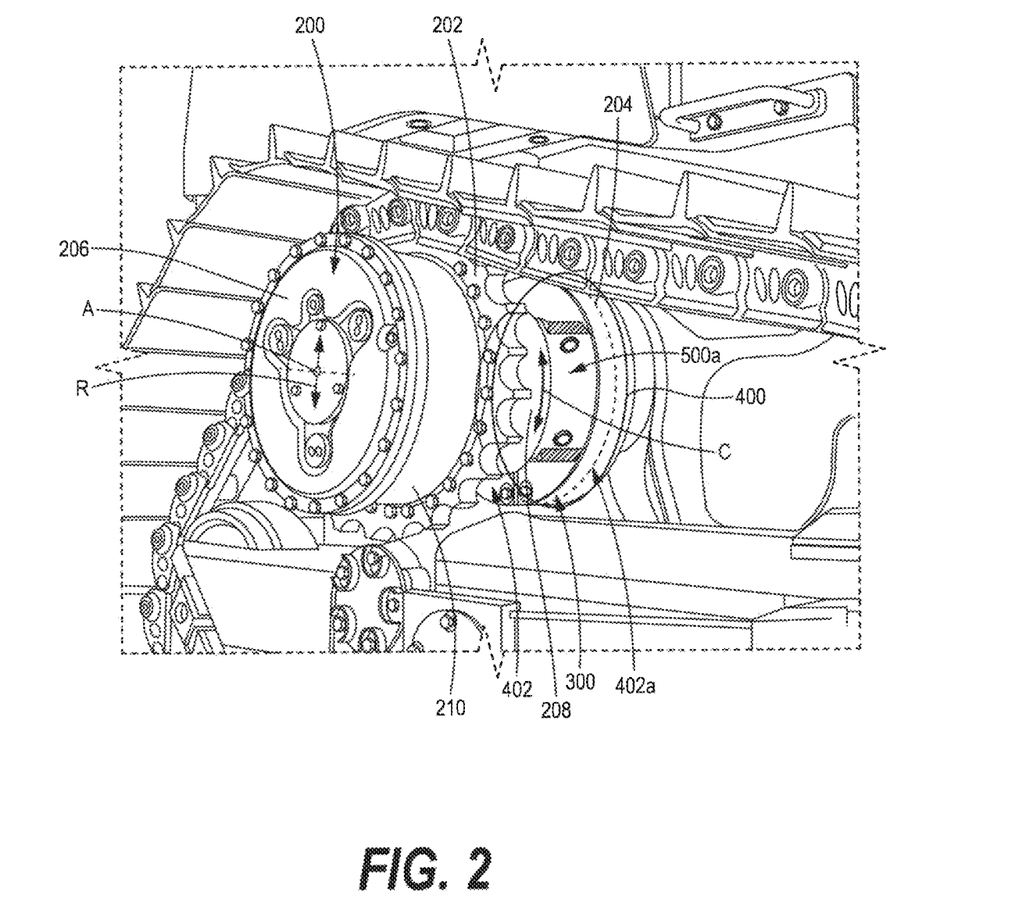
FIG. 2 is an enlarged detail view of the final drive of FIG. 1, illustrating the right side debris deflector, and its bolt-on mounting ring more clearly.

For example, as generally consistent with the disclosure of the '680 patent, the final drive 200 as best seen in FIG. 2 may comprise a fixed interior hub 204 (so called since it does not rotate once attached to the machine body 102), shown in hidden lines since it is covered by the mounting rings 402, 402*a*, a rotating exterior hub 206, a sprocket 202 attached to the rotating exterior hub 206, and a shaft housing 208 extending between the fixed interior hub 204 toward the rotating exterior hub 206.

The shaft housing 208 is so called since it radially surrounds a shaft (not shown but understood to be present in view of the '680 patent) that is driven by the transmission (not shown) of the machine 100. Accordingly, the shaft housing defines an axis of rotation A, a radial direction R, and a circumferential direction C. Also, though not shown in the figures of the present application but shown in the '680 patent, metal to metal face seals (e.g., duo cone seals) may be present inside of the shaft housing 208 to allow the shaft housing to rotate relative to the fixed interior hub 204 without loss of lubricant.

Also, a gear housing 210 may extend between the shaft housing 208, and the rotating exterior hub 206. The gear housing is so called since it may radially surround a planetary gear train or the like (again see the '680 patent). The gear housing may be separate, unitary or integral with the shaft housing.

Figure 12:
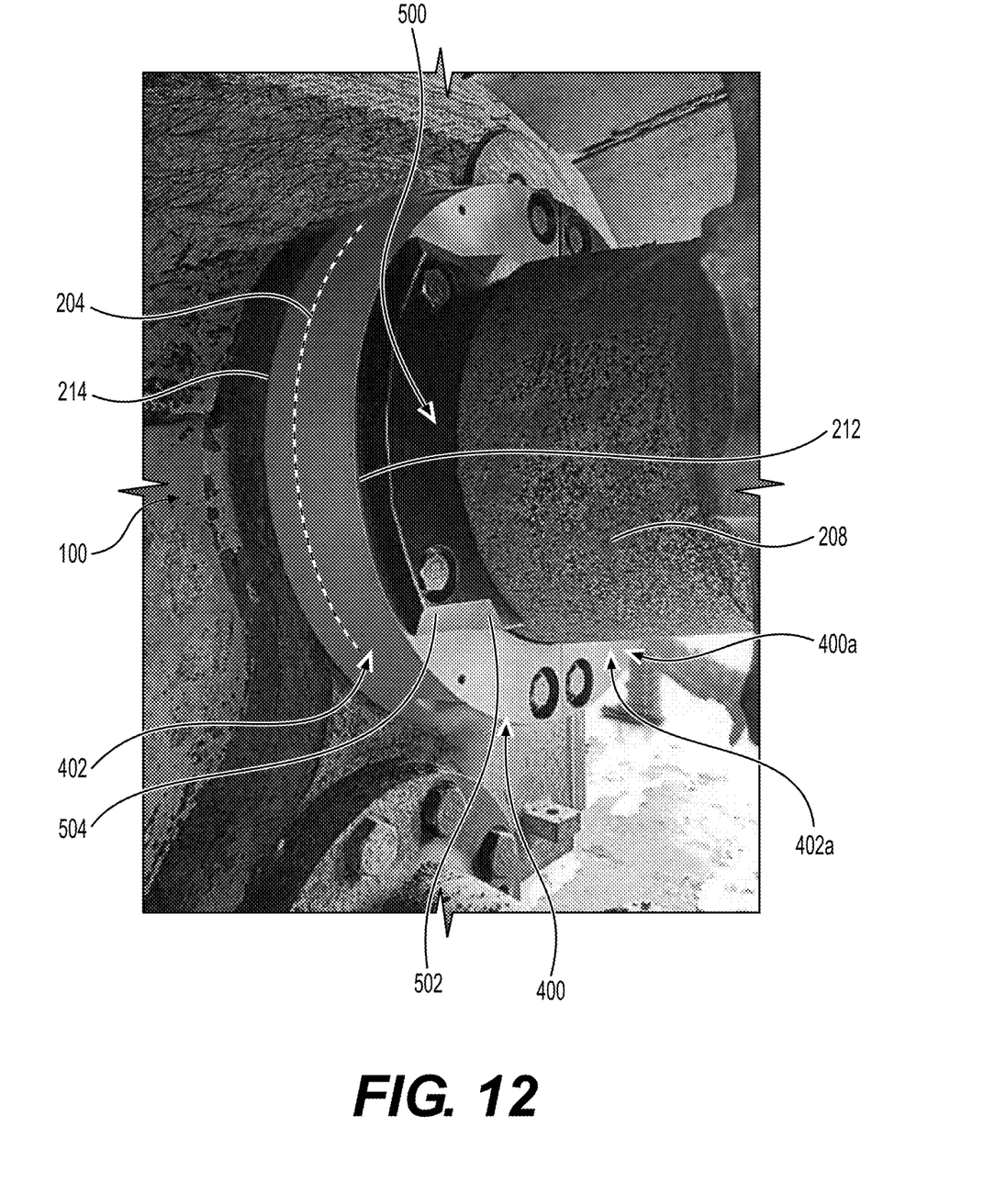
FIG. 12 is a picture of a debris deflector assembly bolted around a shaft housing of a final drive of a tracked machine in the field.

Looking at FIGS. 2 and 12, a debris deflector assembly 300 may be attached to the fixed interior hub 204. This debris deflector assembly 300 may include a pair of bolt-on mounting rings 402, 402*a*, and a pair of debris deflectors 500, 500*a* that are attached to the pair of bolt-on mounting rings 402, 402*a*.

More specifically, each of the pair of bolt-on mounting rings 402, 402*a* may be fastened to the machine 100 as taught by the '680 patent, and at least one of the pair of debris deflectors 500, 500*a* may also be bolted onto the machine 100, sitting flush on at least one of the pair of bolt-on mounting rings 402, 402*a*.

Figure 3:
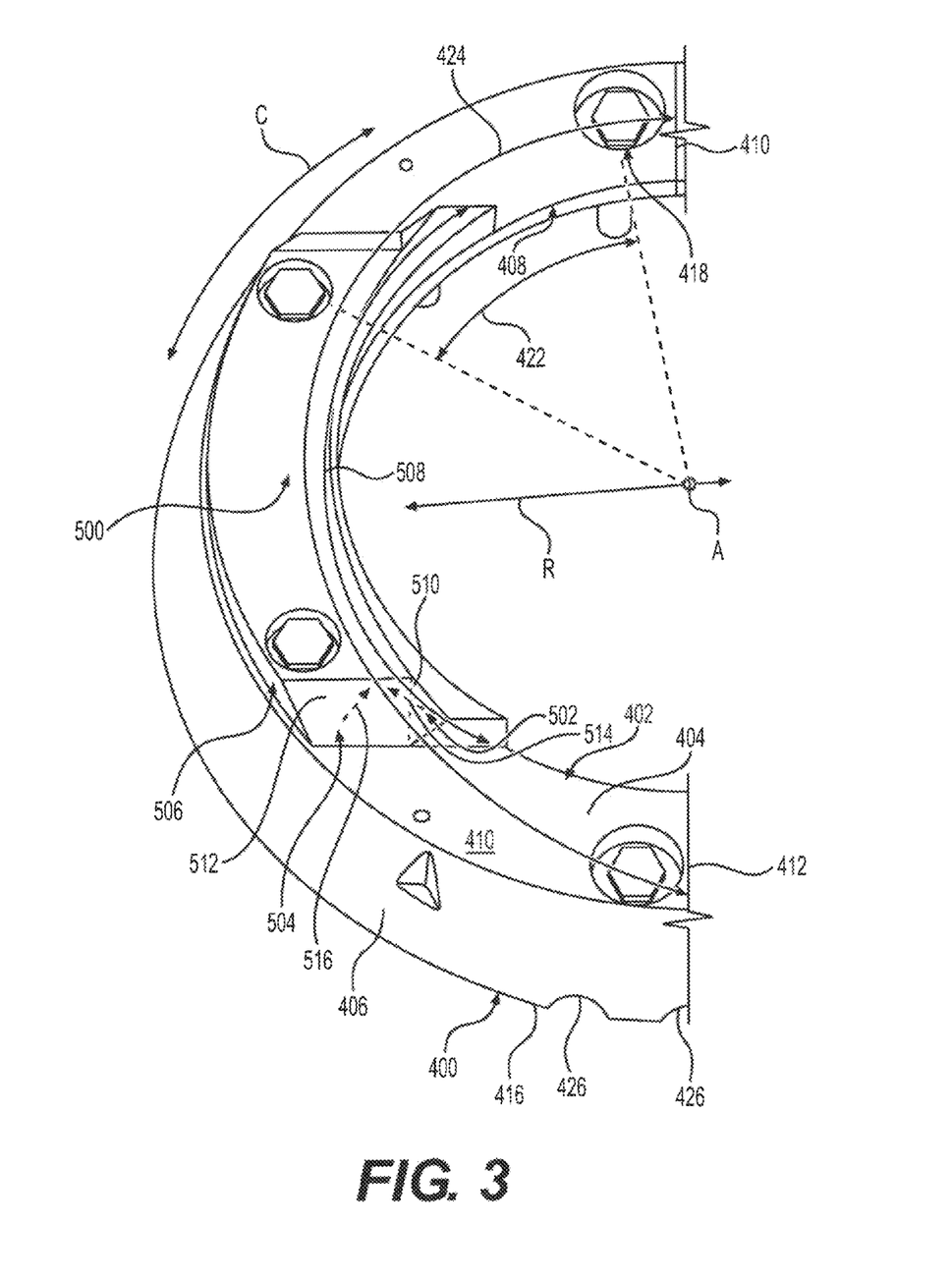
FIG. 3 depicts a left side debris deflector, and its bolt-on mounting ring shown in isolation from the final drive of FIGS. 1 and 2.

In some embodiments as shown in FIGS. 2, 3, and 12, at least one of the pair of debris deflectors 500, and at least one of the pair of bolt-on mounting rings 402, form a left debris deflector subassembly 400, and the other of the pair of debris deflectors 500*a*, and the other of the pair of bolt-on mounting rings 402*a* form a right debris deflector subassembly 400*a*. In other embodiments, the deflectors may mount onto a top and bottom mounting ring simultaneously, etc.

In some embodiments, the pair of debris deflectors 500, 500*a* are identically configured, and the pair of bolt-on mounting rings 402, 402*a* are also identically configured. This may reduce the cost of inventory and manufacturing. This may not be the case for other embodiments of the present disclosure.

Focusing on FIGS. 2 and 3, each of the pair of debris deflectors 500, 500*a* includes a first deflector surface 502 that is spaced away (e.g., radially) from the shaft housing 208, and a second deflector surface 504 that extends directly from the first deflector surface 502 to an outer circumferential surface 506 of the debris deflector 500, 500*a*.

As best understood with reference to FIG. 12, the first deflector surface 502 may be configured to deflect debris away from the shaft housing 208 (and/or the seam 212 (may also be referred to as a junction or joint) that is located between the mounting ring and the shaft housing), and the second deflector surface 504 may be configured to deflect debris away from the fixed interior hub 204 (and/or the seam 214 (or junction or joint) that is located between the mounting ring and the machine body). This may not be the case for other embodiments of the present disclosure.

Next, a debris deflector subassembly 400, 400*a* that may be provided as a retrofit or a replacement kit will be described with reference to FIGS. 2 and 3. Such a debris deflector subassembly 400, 400*a* may comprise a bolt-on mounting ring 402, 402*a* including an at least partially ringlike body 404 defining an axis of rotation (may be coincident or nearly coincident with the axis of rotation A of the shaft housing when attached to the machine 100 or the final drive 200), a radial direction (similarly, may be coincident or nearly coincident with R of the shaft housing), and a circumferential direction (approximately the same as C) about the axis of rotation.

Figure 4:
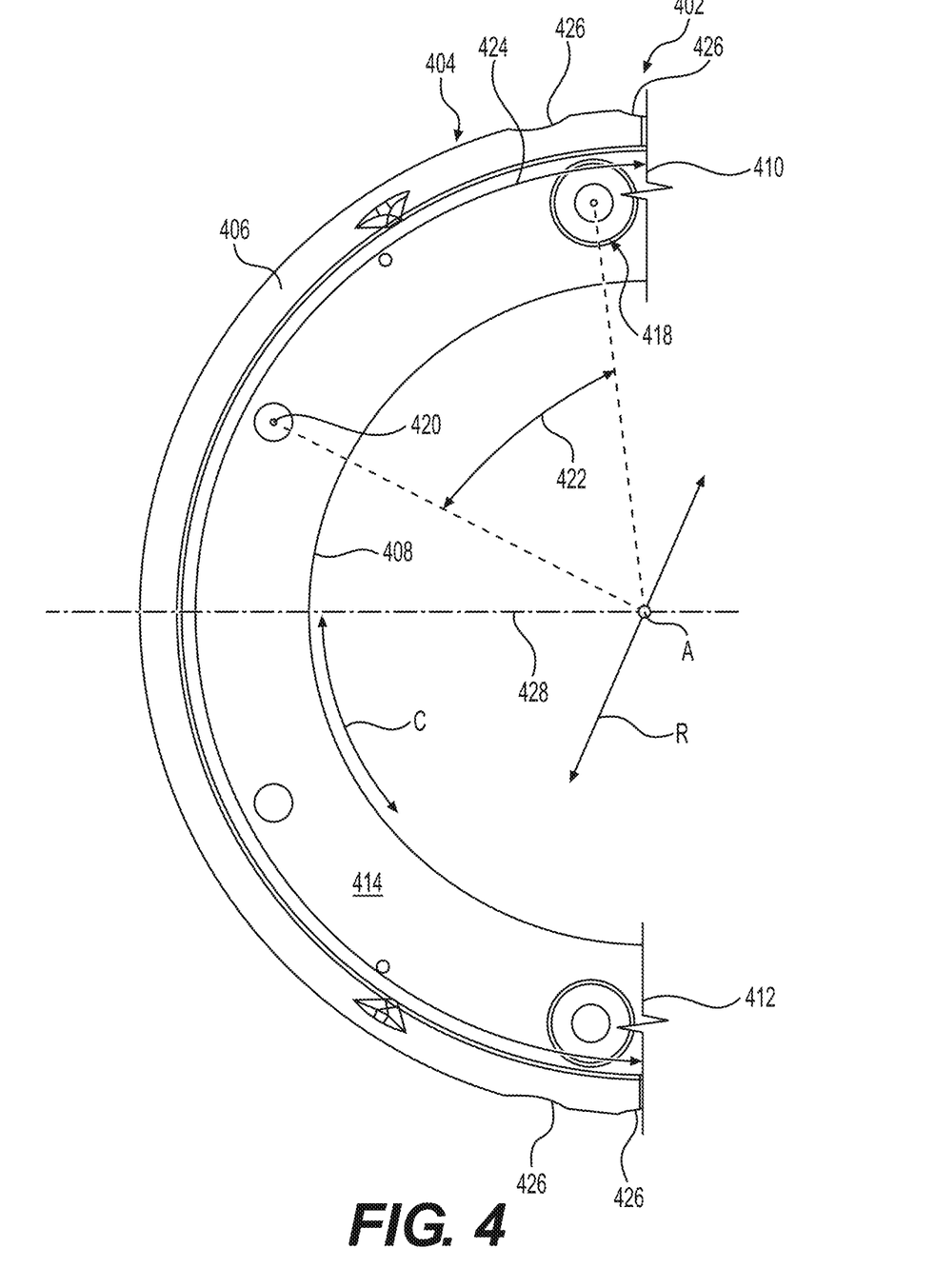
FIG. 4 is a front view of the bolt-on mounting ring of FIG. 3 shown in isolation.

Focusing on FIGS. 3 and 4, the at least partially ringlike body 404 may include an outer (e.g., radially outer) circumferential extending surface 406, an inner (e.g., radially inner) circumferential extending surface 408, a first circumferential end defining surface 410 (may be flat, but not necessarily so), and a second circumferential end defining surface 412 (may also be flat, vertically extending parallel with surface 410 or within 10.0 degrees of parallelism, but not necessarily so). Also, a front surface 414, and a rear surface 416 (see FIG. 5) make up the body 404.

Still referring to FIGS. 3 and 4, the at least partially ringlike body defines a first fastener receiving counterbore 418 on the front surface 414 that is disposed circumferentially adjacent the first circumferential end defining surface 410, and a first fastener straight thru-hole 420 or a tapped hole that is spaced circumferentially from first fastener receiving counterbore 418 (i.e. center to center) a predetermined angle 422 about the axis of rotation A ranging from 50.0 degrees to 70.0 degrees (e.g., about 60.0 degrees) in some embodiments.

Figure 8:
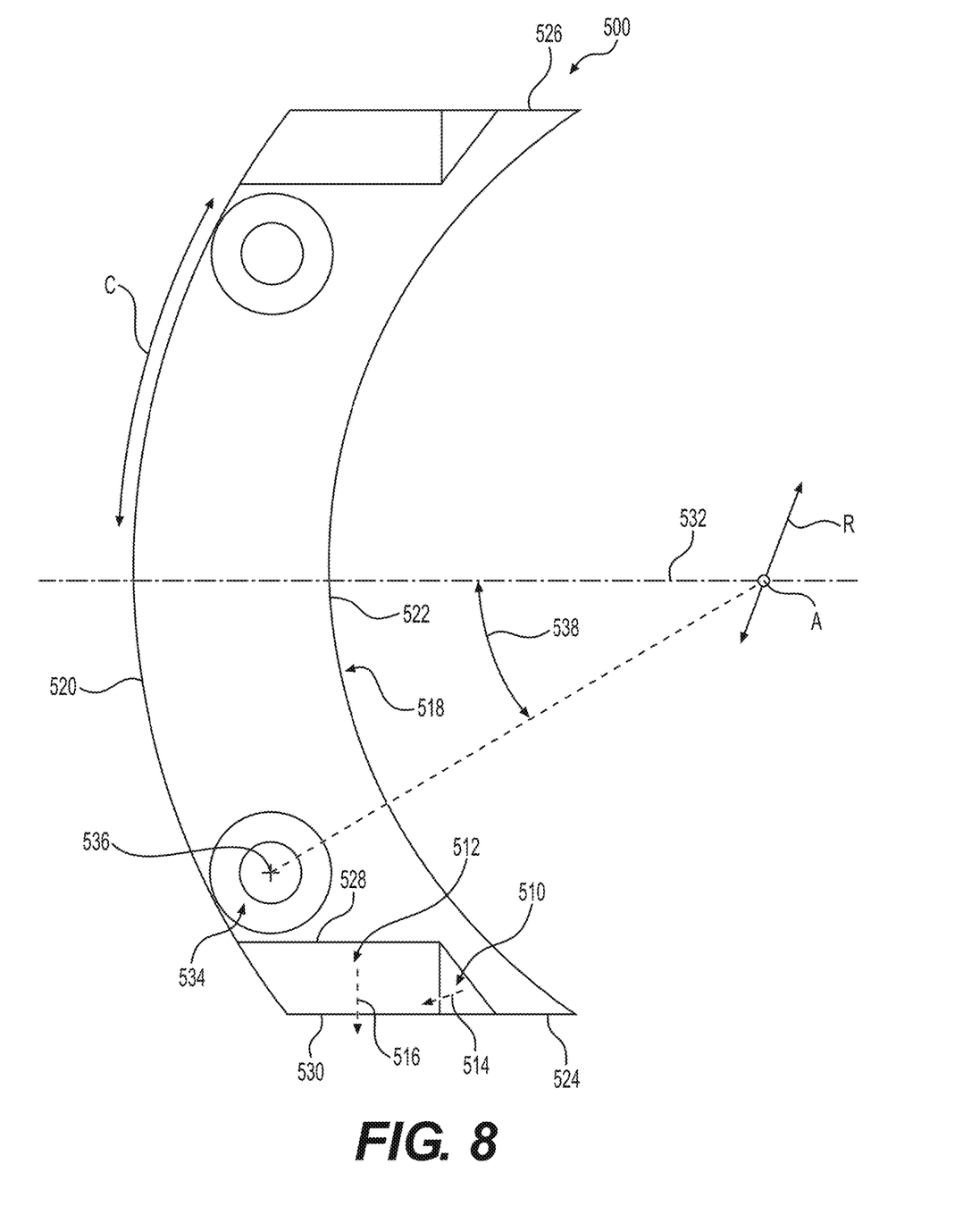
FIG. 8 is a front view of the debris deflector of FIG. 3 shown in isolation.

Looking at FIGS. 3 and 8, the subassembly 400 may further comprise a debris deflector 500 that defines a first circumferential extent 508 that is less than a second circumferential extent 424 of the bolt-on mounting ring 400. More specifically, the first circumferential extent 508 of the debris deflector 500 may be less than 90.0 degrees, and the second circumferential extent 424 of the bolt-on mounting ring 400 may be 180.0 degrees or less. Thus, the ring is configured to be mounted and dismounted about the shaft housing in two parts with near complete 360 degree coverage of the shaft housing and fixed interior hub, while the debris deflector is positioned only where debris is often found to infiltrate the final drive.

Figure 5:
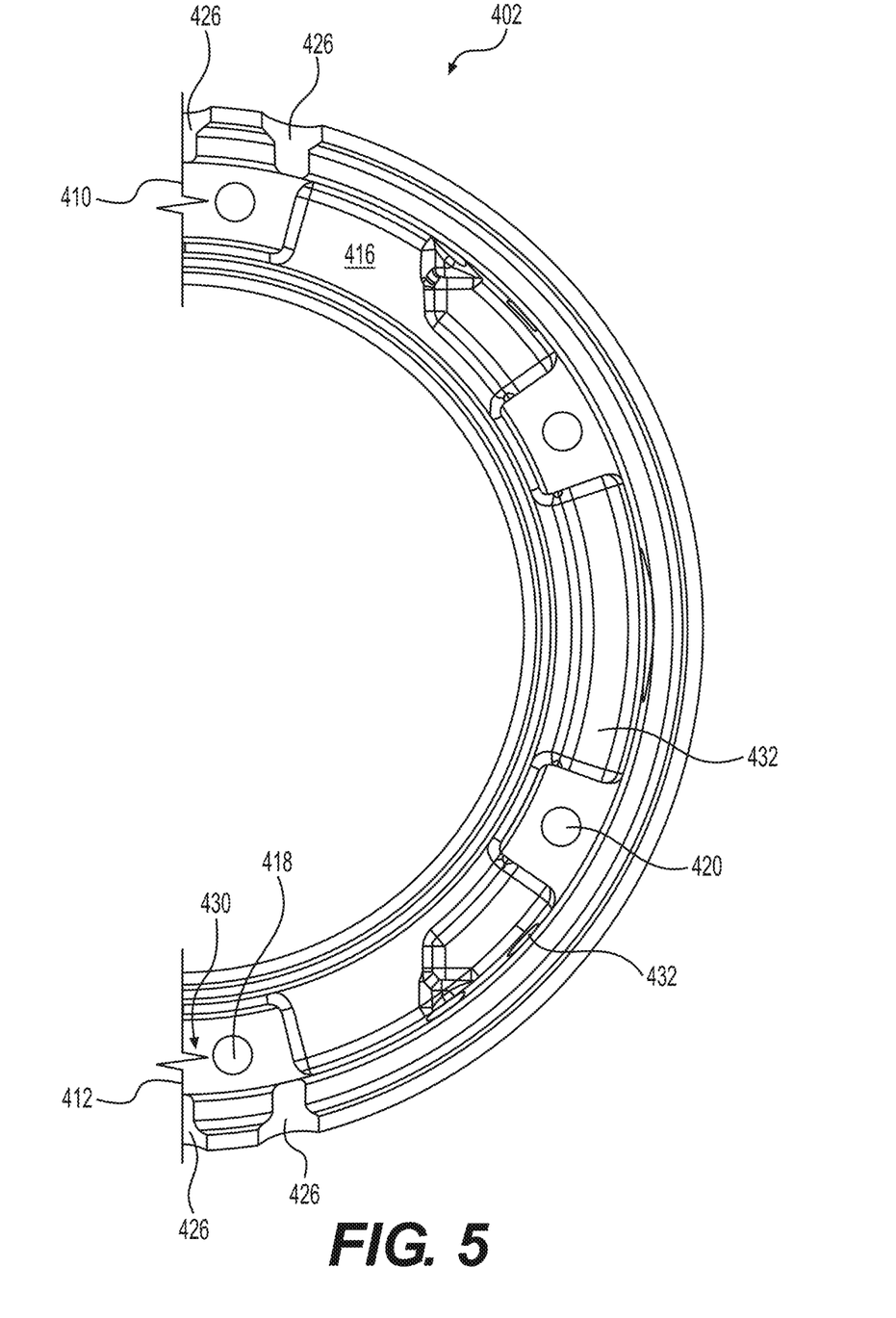
FIG. 5 is a rear view of the bolt-on mounting ring of FIG. 4.

As shown in FIGS. 3, 4, and 5, the bolt-on mounting ring 402 may define at least one slot 426 on a rear surface 416 of the at least partially ringlike body 404 (may also be referred to a shell body since it maintains a consistent wall thickness to aid in casting when fabricated), and a plane of symmetry 428 that includes the axis of rotation A, and the radial direction R (shown to bisect the body into 90.0 degree halves approximately. Two semicircular slots are shown once assembled side by side that may provide drainage (especially when installed near the bottom of the final drive), or may be used as pry slots, etc. Other configurations and numbers of slots are possible (e.g., partially rectangular, etc.). Mounting pads 430 on which the fastener receiving apertures (e.g., see 418, 420) are centered are provided to rest on or contact the machine or the machine body when installed. Ribs 432 are also provided on the rear surface 416 to help provide strength.

Figure 6:
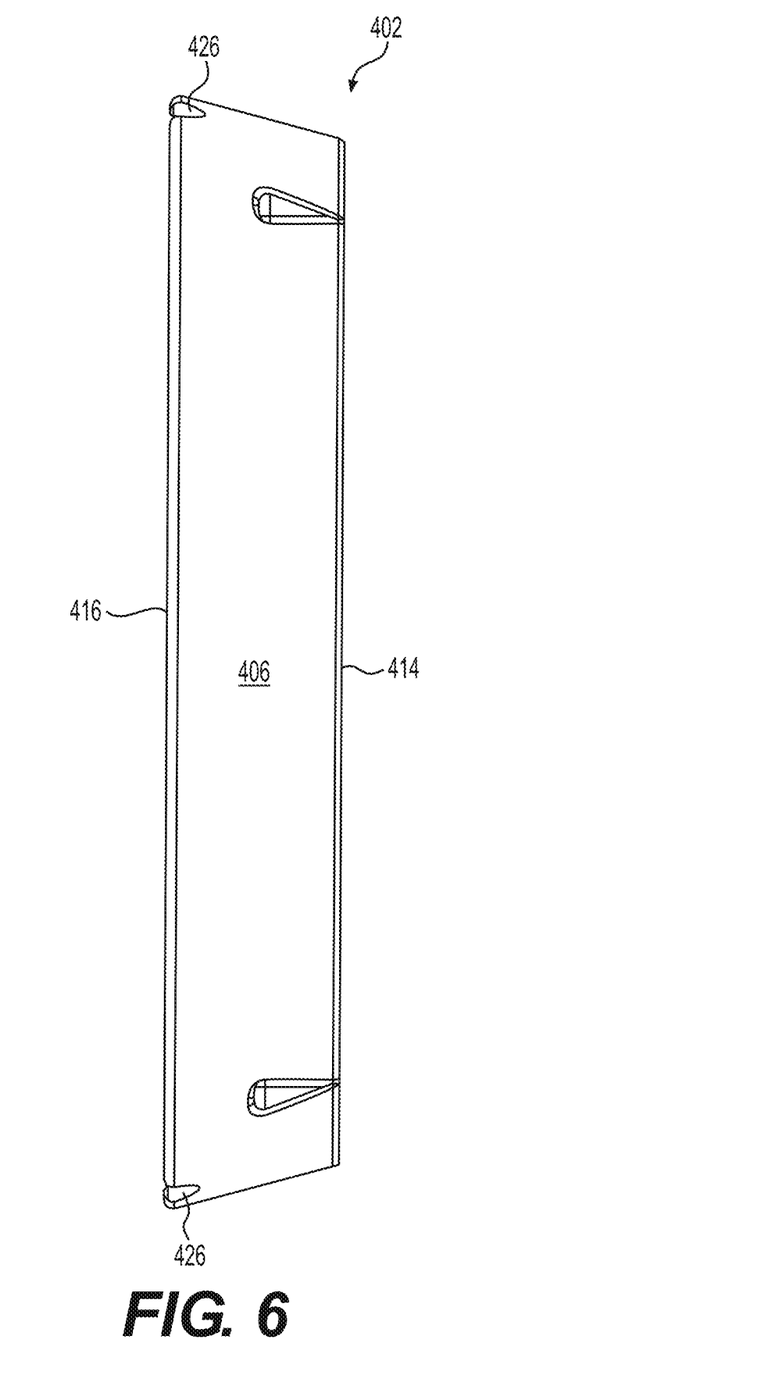
FIG. 6 is a left side view of the bolt-on mounting ring of FIG. 4.
Figure 7:
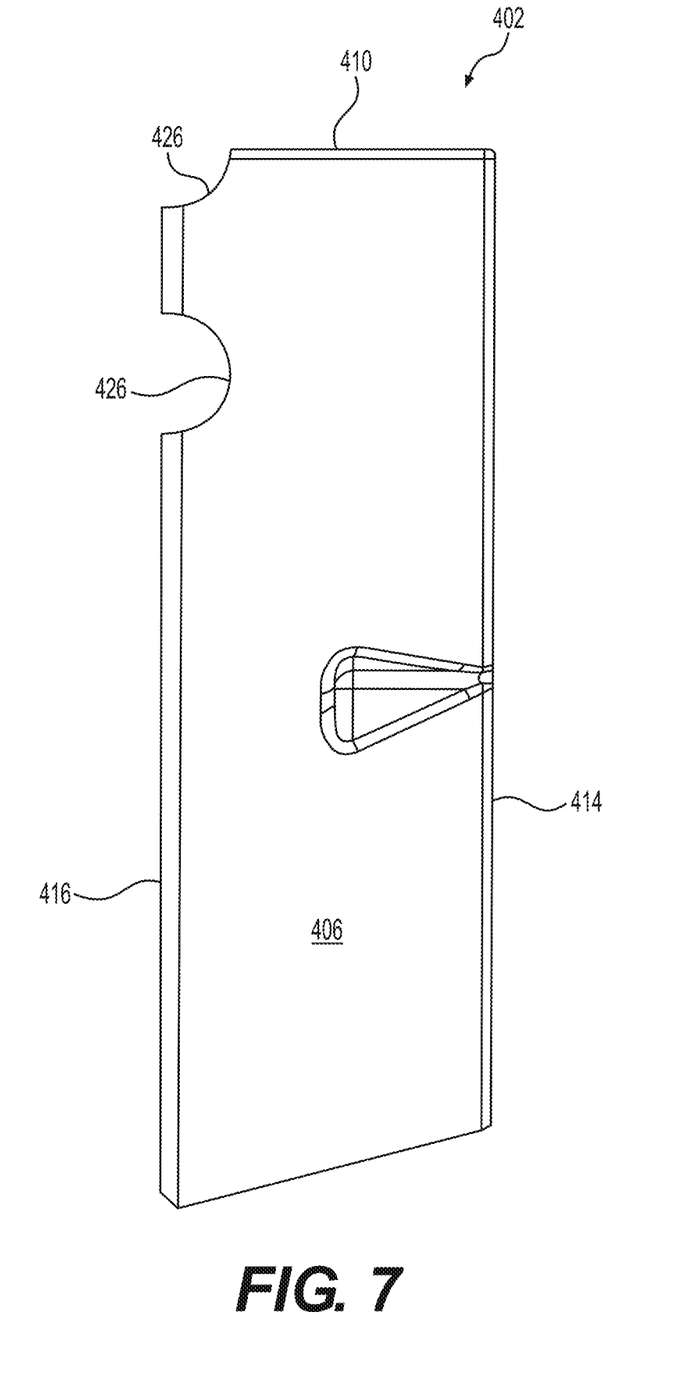
FIG. 7 is a top view of the bolt-on mounting ring of FIG. 4.

Referring now to FIGS. 3 and 6, the debris deflector 500 may include a pair of deflection surfaces (e.g., first deflection surface 510, second deflection surface 512, etc.) that define a pair of surface normals (e.g., first surface normal 514, second surface normal 516) that are not parallel to each other, to the axis of rotation A, to the radial direction R, and the circumferential direction C. This may not be the case for other embodiments of the present disclosure.

However, as alluded to earlier herein, these surfaces are pointed in a certain way to protect the joints found between the assembly/subassembly and the machine/fixed interior hub, and the housing shaft.

Turning now to FIGS. 8 thru 11, a debris deflector 500 that may be provided separately as a replacement part will now be described in detail.

Such a debris deflector 500 may comprise an at least partially annular body 518 defining a central axis (may be approximately the same as A when assembled onto the machine or final drive), a radial direction R, and a circumferential direction C about the central axis.

The at least partially annular body 518 may include an outer radial extremity defining surface 520 (may be shaped as a convex cylindrical or convex conical surface, etc.), an inner radial extremity defining surface 522 (may be shaped as a concave cylindrical or concave conical surface, etc.), a first circumferential extremity defining surface 524 (may be flat and horizontally extending or within 10.0 degrees of horizontal), and a second circumferential extremity defining surface 526 (may be flat and horizontally extending or within 10.0 degrees of horizontal, may form an included angle facing toward the central axis).

As best seen in FIG. 8, a first deflection surface 510 may extend from the first circumferential extremity defining surface 524, and may define a first surface normal 514 that points away from the central axis (see A). More particularly, the first surface normal 514 may point mostly in the radial direction R and along the central axis (see A). That is to say, this surface normal may have a circumferential component that is less than 30.0 degrees, and radial and axial components that range from 30.0 degrees to 45.0 degrees. As illustrated, the first deflection surface 510 has a flat triangular shape. This may not be the case for other embodiments of the present disclosure.

Also, a second deflection surface 512 extends radially outwardly from the first deflection surface 510, and circumferentially from the first circumferential extremity defining surface 524. The second deflection surface defines a second surface normal 516 that is non-parallel (or oblique) to the first surface normal 514. More particularly, the second surface normal 516 points mostly along the circumferential direction C and along the central axis (may be expressed in circumferential and axial components that range from 30.0 degrees to 60.0 degrees, or about 40.0 degrees to 50.0 degrees). That is to say, this surface normal does not point radially very much. As depicted, the second deflection surface 512 has a flat quadrilateral shape (or four sided shape with one round outside edge at its intersection with surface 520). More specifically, the flat quadrilateral shape may have a top edge 528, and a bottom edge 530 that is shorter in length than the top edge 528. Other configurations for these various surfaces and edges are possible in other embodiments of the present disclosure.

Figure 9:
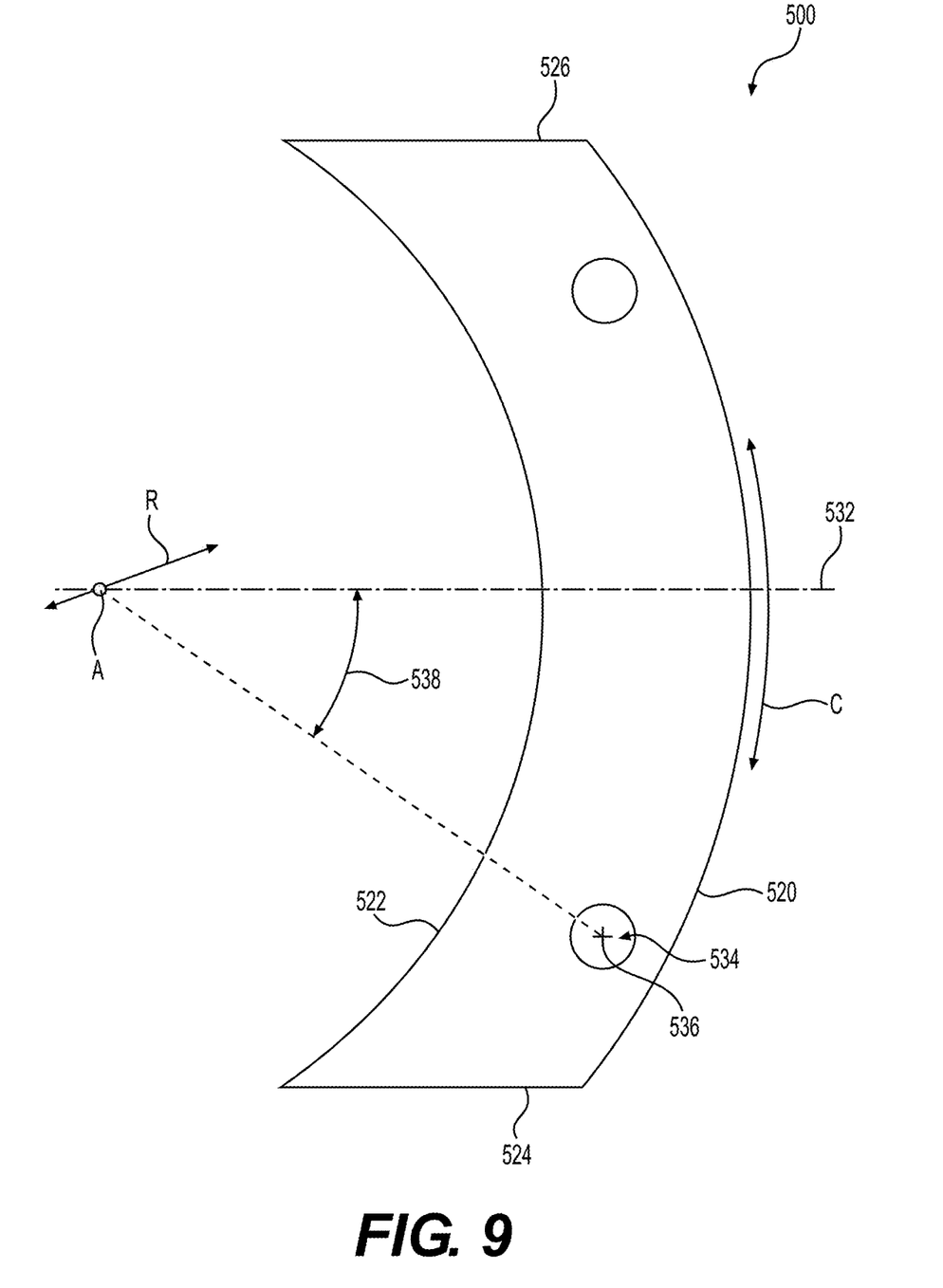
FIG. 9 is a rear view of the debris deflector of FIG. 8.
Figure 10:
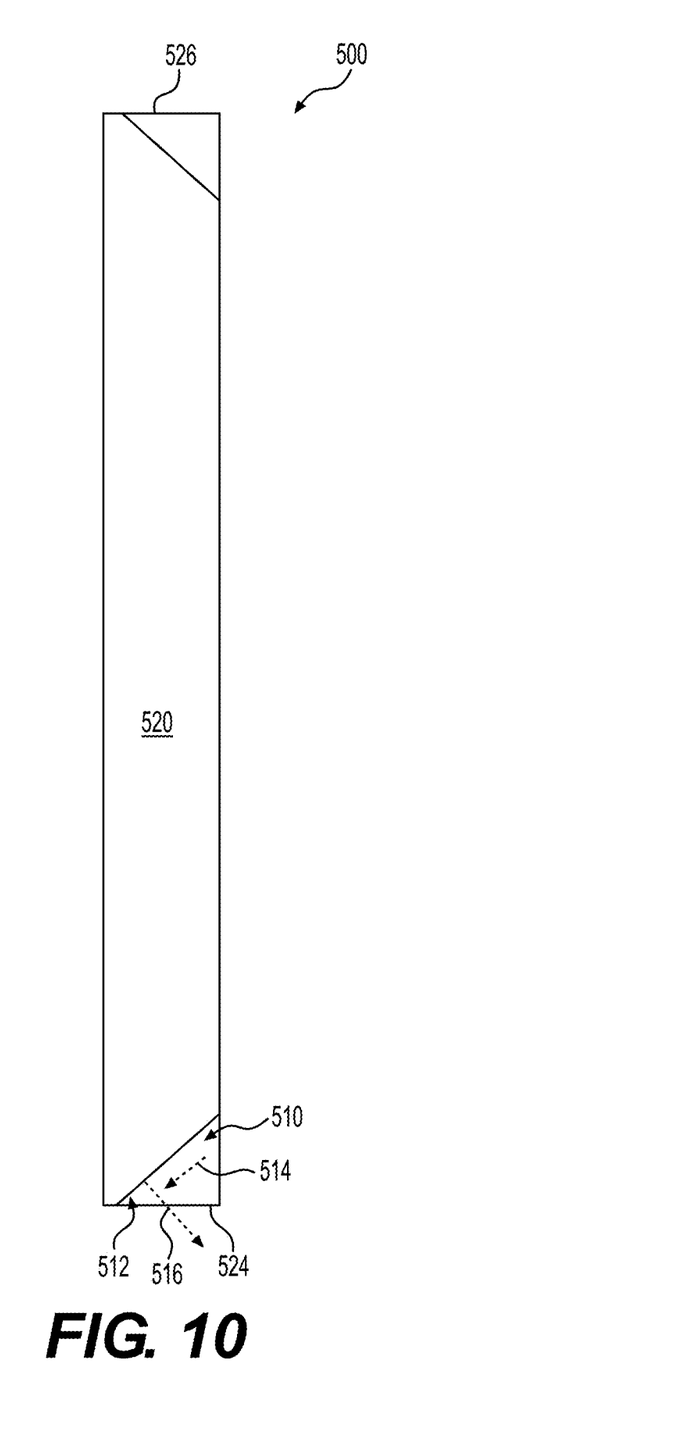
FIG. 10 is a left side view of the debris deflector of FIG. 8.
Figure 11:
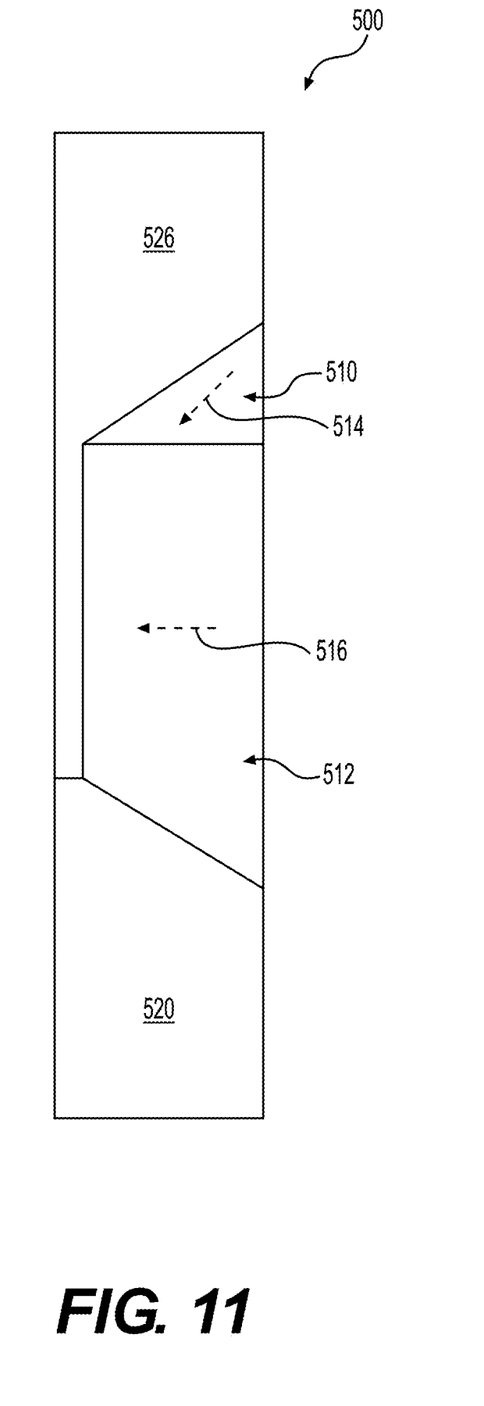
FIG. 11 is a top view of the debris deflector of FIG. 8.

FIG. 9 shows that the at least partially annular body defines a plane of symmetry 532 (may be horizontal in the installed state) containing the central axis (see A) and the radial direction R.

Looking at FIGS. 8 and 9 together, the at least partially annular body defines a first fastener receiving aperture 534 (e.g. a counterbore) that is disposed circumferentially adjacent the second deflection surface 512, and that defines a center 536 that is spaced circumferentially away from the plane of symmetry 532 a first angle 538 about the central axis that ranges from 25.0 degrees to 35.0 degrees (e.g. about 30.0 degrees) in some embodiments of the present disclosure.

Any of the rings or deflectors described herein may be manufactured from any suitable material including, but not limited to, steel, aluminum, iron, cast-iron, grey cast-iron, and thermoplastics. Any of these components may be machined. In particular, the angled deflector surfaces may be fabricated via milling, grinding, electrode discharge machining, etc.

Any of the dimensions, angles, ratios, configurations, materials, etc. discussed herein may be varied as needed or desired to be different than any value or characteristic specifically mentioned herein or shown in the drawings for any of the embodiments.

INDUSTRIAL APPLICABILITY

In practice, a machine, a debris deflector assembly, a debris deflector subassembly, and/or a deflector or replacement kit (that may include one or more of these items) constructed according any embodiment disclosed herein may be sold, bought, manufactured or otherwise obtained in an OEM (original equipment manufacturer) or after-market context. In some cases, various components, may be provided as a kit to repair or retrofit a machine in the field.

For example, FIG. 12 shows how a replacement or a retrofit on a machine in the field may look.

As has been illustrated, a deflector may be provided that can be bolted or otherwise attached onto the final drive system of an undercarriage of a vehicle or machine to help prevent the debris from entering the internal areas of the machine. This deflector may prevent any hardware damage or failure of machine parts, fouling of mechanisms, etc.

Again, other embodiments and configurations of the deflector or mounting ring are contemplated herein and are intended to be within the scope of the present application. For example, a plurality of smaller deflectors with more or less deflection surfaces may be provided. Or, larger deflectors (e.g., with a greater circumferential extent) may be provided, etc.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A debris deflector for preventing the fouling of a final drive, the debris deflector comprising:
   an at least partially annular body defining a central axis, a radial direction, and a circumferential direction about the central axis, the at least partially annular body including
      an outer radial extremity defining surface;
      an inner radial extremity defining surface;
      a first circumferential extremity defining surface; and
      a second circumferential extremity defining surface;
      wherein the first and second circumferential extremity defining surfaces each include a first deflection surface having a triangular shape and a second deflection surface, the first and the second deflection surfaces being non-parallel.

2. The debris deflector of claim 1, wherein the first deflection surface defines a plane which points in the radial direction and along the central axis.

3. The debris deflector of claim 1, wherein the at least partially annular body includes a second deflection surface extending radially outwardly from the first deflection surface, and circumferentially from the first circumferential extremity defining surface.

4. The debris deflector of claim 3, wherein the second deflection surface points along the circumferential direction and along the central axis.

5. The debris deflector of claim 4, wherein the second deflection surface has a quadrilateral shape or four sided shape with an outside curved edge.

6. The debris deflector of claim 5, wherein the quadrilateral shape or four sided shape has a top edge, and a bottom edge that is shorter in length than the top edge.

7. The debris deflector of claim 3, wherein the at least partially annular body defines a plane of symmetry containing the central axis and the radial direction.

8. The debris deflector of claim 7, wherein the at least partially annular body defines a first fastener receiving aperture that is disposed circumferentially adjacent the second deflection surface, and that defines a center that is spaced circumferentially away from the plane of symmetry a first angle about the central axis that ranges from 25.0 degrees to 35.0 degrees.

9. A debris deflector subassembly for preventing the fouling of a final drive, the debris deflector subassembly comprising:
   a bolt-on mounting ring including
      an at least partially ringlike body defining
         an axis of rotation, a radial direction, and a circumferential direction about the axis of rotation, the at least partially ringlike body including
            an outer circumferential extending surface;
            an inner circumferential extending surface;
            a first circumferential end defining surface;
            a second circumferential end defining surface;
            a front surface; and
            a rear surface;
         wherein the at least partially ringlike body defines a first fastener receiving counterbore on the front surface that is disposed circumferentially adjacent the first circumferential end defining surface, and a first fastener straight thru-hole that is spaced circumferentially from the first fastener receiving counterbore a predetermined angle about the axis of rotation ranging from 50.0 degrees to 70.0 degrees.

10. The debris deflector subassembly of claim 9, further comprising a debris deflector that defines a first circumferential extent that is less than a second circumferential extent of the bolt-on mounting ring, and that includes a pair of deflection surfaces that are not parallel to each other, to the axis of rotation, to the radial direction, and the circumferential direction.

11. The debris deflector subassembly of claim 10, wherein the first circumferential extent is less than 90.0 degrees, and the second circumferential extent is 180.0 degrees or less.

12. The debris deflector subassembly of claim 9, wherein the bolt-on mounting ring defines at least one slot on a rear surface of the at least partially ringlike body, and a plane of symmetry that includes the axis of rotation, and the radial direction.

13. A final drive for use with a machine, the final drive comprising:
- a fixed interior hub;
- a rotating exterior hub;
- a sprocket attached to the rotating exterior hub;
- a shaft housing extending between the fixed interior hub toward the rotating exterior hub;
- a gear housing extending between the shaft housing and the rotating exterior hub; and
- a debris deflector assembly attached to the fixed interior hub, the debris deflector assembly including
  - a pair of bolt-on mounting rings, and a pair of debris deflectors attached to the pair of bolt-on mounting rings, the pair of debris deflectors each including first and second non-parallel deflection surfaces provided at circumferential ends.

14. The final drive of claim 13, wherein each of the pair of bolt-on mounting rings is fastened to the machine, and at least one of the pair of debris deflectors is bolted onto the machine, sitting flush on at least one of the pair of bolt-on mounting rings.

15. The final drive of claim 13, wherein at least one of the pair of debris deflectors, and at least one of the pair of bolt-on mounting rings form a right debris deflector subassembly, and the other of the pair of debris deflectors, and the other of the pair of bolt-on mounting rings form a left debris deflector subassembly.

16. The final drive of claim 13, wherein the pair of debris deflectors are identically configured, and the pair of bolt-on mounting rings are identically configured.

17. The final drive of claim 13, wherein each of the pair of debris deflectors includes a first deflector surface that is spaced away from the shaft housing, and a second deflector surface that extends directly from the first deflector surface to an outer surface of the debris deflector.

18. The final drive of claim 17, wherein the first deflector surface is configured to deflect debris away from the shaft housing, and the second deflector surface is configured to deflect debris away from the fixed interior hub.

* * * * *